C. NELSON & L. H. DYER.
COFFEE MACHINE.
APPLICATION FILED SEPT. 10, 1910.
1,134,979.
Patented Apr. 6, 1915.
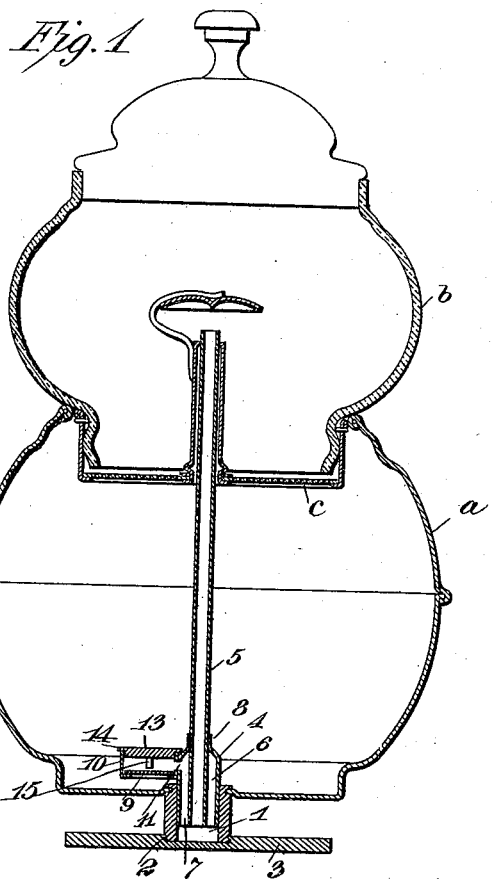
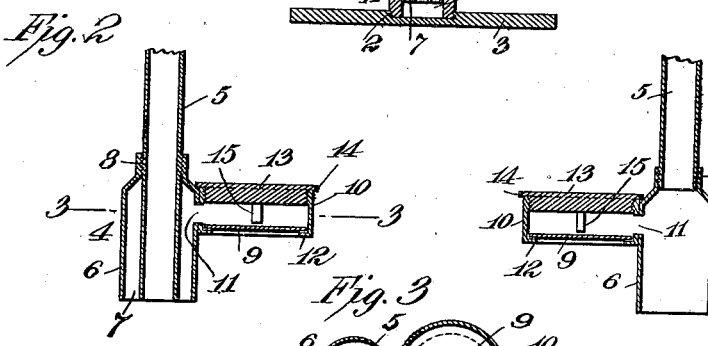
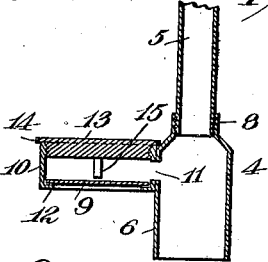
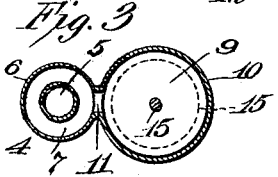
Witnesses:
Jas. F. Coleman
John L. Lotsch
Inventors
Charles Nelson
Lenard H. Dyer
By Dyn Dyn & Taylor
Attorneys.

UNITED STATES PATENT OFFICE.

CHARLES NELSON, OF NEW YORK, N. Y., AND LEONARD H. DYER, OF GREENWICH, CONNECTICUT, ASSIGNORS TO S. STERNAU & COMPANY, OF NEW YORK, N. Y., A COPARTNERSHIP COMPOSED OF SIGMUND STERNAU AND LIONEL STRASSBURGER.

COFFEE-MACHINE.

1,134,979. Specification of Letters Patent. Patented Apr. 6, 1915.

Application filed September 10, 1910. Serial No. 581,373.

*To all whom it may concern:*

Be it known that we, CHARLES NELSON, a citizen of the United States, and a resident of New York city, borough of Brooklyn, county of Kings, and State of New York, and LEONARD H. DYER, a citizen of the United States, and a resident of Greenwich, county of Fairfield, State of Connecticut, have invented a certain new and useful Coffee-Machine, of which the following is a specification, reference being had to the accompanying drawings.

The objects we have in view is the production of a coffee machine of the type employing a pump or percolator and a small heating chamber, in which the action will be certain and sure and very prompt, which will continue to pump, irrespective of the temperature of the contents of the essence receptacle, which may be taken to pieces and readily cleaned and which will be simple and not likely to get out of order, and at the same time will be durable and inexpensive. These and further objects will appear from the following specification and accompanying drawings considered together or separately.

In the drawings, Figure 1 is a sectional view of the operative portions of a coffee machine showing one embodiment of our invention. Fig. 2 is a detail of the percolator or pump. Fig. 3 is a sectional view on the line 3—3 of Fig. 2. Fig. 4 is a view similar to Fig. 2 but of a modification.

In all of the several views like parts are designated by the same reference characters.

In the drawings, *a* represents the receptacle of the coffee machine for containing the water before the operation commences, and the essence or potable coffee after the same is made. In the embodiment chosen for the illustration of our invention, the receptacle *a* is the body of a coffee machine adapted to be supported on a stand (not shown) and to support in its turn a globe *b* and a screen or sieve *c*, the latter containing the coffee or other material from which the decoction is to be made. When the invention is applied to a coffee pot or other form of coffee machine it will be modified accordingly, if necessary.

In the bottom of the receptacle *a* is a small chamber 1, communicating through an opening with the bottom of the receptacle *a*. This small chamber is adapted to be applied to the source of heat. In connection with the coffee machine the bottom of this chamber is acted on directly by the lamp or other heating means. In connection with the coffee pot this chamber rests directly upon the stove. As shown, the chamber has its longitudinal dimension greater than its cross-sectional dimension. The chamber is open at the bottom as shown, its outer walls, which are cylindrical, are provided with screw threads 2. A plate 3 engages with these screw threads and forms a cover for the bottom of the chamber. It also extends beyond the walls of the chamber and forms a device for keeping the heat of the lamp or other heating means away from the receptacle *a*. It also serves the purpose of conducting the heat from the source of heat to the chamber 1.

The percolator or pump 4 comprises a center tube 5, which extends from the small heating chamber 1 up through the screen or sieve *c*, its upper end being open, so that the liquid which passes up through the tube 5 will be discharged over the coffee or other material in the screen, and will seep through the same back into the receptacle *a*. The lower portion of the percolator is formed of a cap 6, in the form of a cylindrical chamber, which enters the interior of the small heating chamber 1 as shown. The external diameter of this cap 6 should be substantially the same as the internal diameter of the small heating chamber 1, so that a snug and close fit will be produced between the two. In the preferred embodiment of our invention the center tube 5 extends down to substantially the same plane as the bottom of the cap 6. This produces an annular chamber 7 (see Fig. 3). The liquid will circulate downward through the annular chamber, and then upward through the tube 5. The upper portion of the cap 6 is drawn in at 8 and is connected to the tube 5 by solder, or is otherwise suitably connected thereto. If desired, the two may be connected together by screw threads, as shown, for removal, so that the parts can be separated and cleaned if desired.

The valve 9 is in the form of a disk of suitable size. The valve casing 10 is cylindrical and is attached to and supported by the tube 5, by being connected to the cap 6. A port 11, which constitutes a substantially horizontal passage, serves as an avenue of communication between the interior of the valve casing 10 and the interior of the cap 6. In the preferred embodiment illustrated in Figs. 1, 2 and 3, this port also communicates with the annular chamber 7. The bottom of the valve casing 10 is provided with a flange 12, upon which rests the valve, thus forming a valve seat. The cover 13 of the valve casing is attached to the valve casing by screw threads as shown, and is provided with an edge 14, which is preferably milled or burred (not illustrated) so that it may be readily unscrewed. For the purpose of preventing the valve from lifting too high above its seat, we provide a pin 15, which is attached to the center of the bottom of the cover and depends a suitable distance to properly limit the upward movement of the valve. The valve is made preferably of metal and sufficiently light so that it will be lifted off its seat by the pressure of the liquid entering the valve chamber.

The operation is as follows: Coffee, or other substance from which the essence is to be made, is introduced in the sieve c in the usual manner. Water, either hot or cold, is introduced in the receptacle a to the proper level, the parts being assembled as shown in Fig. 1. The water will enter the valve casing by lifting up the valve from its seat, will pass into the cap 6, will enter the heating chamber 1 and will rise in the center tube 5. Heat being applied to the small heating chamber 1 will very soon produce a sufficient pressure within the chamber caused by the heating of the water and generation of steam or vapor to elevate the liquid contents of the center tube 5, and eject them out of the top of the latter. This will destroy the equilibrium of pressure and liquid from the receptacle a will take the place of that ejected by passing around the valve and into the cap 6. This intermittent action will keep up, pumping the liquid up through the center tube and over the contents in the sieve c, until essence of sufficient strength and temperature is produced.

The percolator is readily removed from the receptacle by lifting it out and is also readily cleansed by dipping it in cleansing liquid or, if desired, the cover 13 may be removed, removing the valve and permitting cleansing of the interior of the valve casing.

It will be observed that the circulation of liquid is through the port 11 downward through the annular chamber 7 and up through the center tube 5, producing an intermittent circulation in one direction.

In the modification of our invention, shown in Fig. 4, the tube 5 does not extend into the cap 6. In this construction of apparatus the port 11 communicates with the unencumbered interior of the cap 6. In operation the circulation is through the port 11 and into the cap 6, and then out of said cap into the tube 5, the circulation being intermittent in opposite directions.

In accordance with the provisions of the patent statutes, we have described the principle of our invention, together with the apparatus which we now consider to represent the best embodiment thereof; but we desire to have it understood that the apparatus shown is merely illustrative and that the invention can be carried out in other ways.

Having now described our invention, what we claim as new and desire to secure by Letters Patent is,

1. A coffee machine having a receptacle; a heating chamber of relatively small size depending from the center of the bottom of the receptacle and communicating with the interior thereof; a cap extending down into the heating chamber and closing the top thereof, said cap also extending up into the receptacle, a vertical tube connected to and communicating with the inside of the cap; a valve casing on one side of the upper part of the cap, above the heating chamber and lying within the receptacle, the walls of said casing being directly connected to the cap and with their interiors communicating by means of a horizontal passage, said valve casing lying off to one side of the cap, and also off to one side of the heating chamber, and a vertically moving gravity valve within the valve casing.

2. A coffee machine having a receptacle; a heating chamber of relatively small size, depending from the center of the bottom of the receptacle and communicating with the interior thereof; a cap resting in the heating chamber and extending up into the receptacle, said cap closing the top of the heating chamber, a vertical tube passing through the top of the cap and extending down into the heating chamber; a valve casing the wall of which is directly connected to the wall of the cap above the heating chamber and with their interiors communicating therewith by means of a horizontal passage and lying off to one side of the heating chamber, and a vertically moving gravity valve within said valve casing.

3. A coffee machine having a receptacle; a centrally located heating chamber depending from the bottom thereof, said heating chamber being of relatively small size; a centrally alined, vertical tube connecting with the heating chamber and extending up into the receptacle; a cylindrical cap resting in the heating chamber and extending up into the receptacle and closing the top of the heating chamber; a valve casing the wall of which is directly connected to the wall of the cylindrical cap to one side thereof, and above the heating chamber and off to one side thereof, and with their interiors communicating by means of a horizontal passage, said casing having an inlet at the bottom, and a disk valve in the valve casing.

4. A coffee machine having a main receptacle; a small heating chamber below and in communication with the said receptacle, said chamber being of cylindrical shape and open at the bottom; a flat plate larger than the perimeter of the chamber and relatively thick, said plate having a depression therein, extending only part way through, and screw threads on the sides of the depression, said threads engaging with the lower outer edge of the heating chamber.

5. In a coffee pot having a main receptacle, and a heating chamber at the base thereof, said heating chamber being of relatively small size, the combination with a percolator tube, and a cap, the said percolator tube extending into the main receptacle, and the said cap resting within the heating chamber and closing the top of the latter; a valve casing on one side of the cap, and above the heating chamber and lying off to one side of said heating chamber and directly connected to the cap and communicating therewith by means of a horizontal passage, a valve within the casing, and a connection between the percolator tube and the cap, the said connection consisting of screw threads on the percolator tube engaging with screw threads in an opening in the upper end of the cap.

6. An apparatus of the class described, having a main receptacle; a centrally located heating chamber of cylindrical shape located below the receptacle; and a container for the substance from which the infusion is to be made, located adjacent to the upper part of the receptacle; in combination with a liquid porcolating device, said device comprising a center tube; a cap connected to the tube, adjacent to the lower end thereof, said cap extending down into the heating chamber, and also extending up into the receptacle, and entirely closing the top of the heating chamber; there being a port on one side of the cap above the heating chamber; a valve casing having a port therein, said valve casing and cap being directly connected together, on one side of the cap, with the two ports in communication, the bottom of the valve casing being open; an encircling flange around the opening; a flat valve resting on the flange; and a cover removably attached to the valve casing and inclosing the valve, the said valve casing lying entirely off to one side of the cap and off to one side of the heating chamber.

7. An apparatus of the class described, having a main receptacle; a centrally located heating chamber of cylindrical shape located below the receptacle; and a container for the substance from which the infusion is to be made, located adjacent to the upper part of the receptacle; in combination with a liquid percolating device, said device comprising a center tube; a cap connected to the tube adjacent to the lower end thereof, said cap extending down into the heating chamber, and also extending up into the receptacle, and entirely closing the top of the heating chamber; there being a port on one side of the cap above the heating chamber; a valve casing of circular cross-section having a port therein, said valve casing and cap being directly connected together, on one side of the cap, with the two ports in communication, the bottom of the valve casing being open; an encircling flange around the opening; a disk valve resting on the flange; and a cover removably attached to the valve casing and inclosing the valve, the said valve casing lying entirely off to one side of the cap and off to one side of the heating chamber.

8. An apparatus of the class described, having a main receptacle; a centrally located heating chamber of cylindrical shape located below the receptacle and being of a depth substantially as great as its diameter; and a container for the substance from which the infusion is to be made, located adjacent to the upper part of the receptacle; in combination with a liquid percolating device, said device comprising a center tube; a cap connected to the tube adjacent to the lower end thereof, said cap extending down into the heating chamber, and also extending up into the receptacle, and entirely closing the top of the heating chamber; there being a port on one side of the cap above the heating chamber; a valve casing of circular cross-section having a port therein, said valve casing and cap being directly connected together, on one side of the cap, with the two ports in communication, the bottom of the valve casing being open; an encircling flange around the opening; a disk valve resting on the flange; and a cover removably attached to the valve casing and inclosing the valve, the said valve casing lying entirely off to one side of the cap and off to one side of the heating chamber.

9. An apparatus of the class described, having a main receptacle; a centrally located heating chamber of cylindrical shape located below the receptacle, said heating chamber terminating at substantially the level of the bottom of the receptacle; and a container for the substance from which the infusion is to be made, located adjacent to the upper part of the receptacle; in combination with a liquid percolating device, said device comprising a center tube; a cap connected to the tube adjacent to the lower end thereof, said cap extending down into the heating chamber, and also extending up into the receptacle, and entirely closing the top of the heating chamber; there being a port on one side of the cap above the heating chamber; a valve casing of circular cross-section having a port therein, said valve casing and cap being directly connected together, on one side of the cap, with the two ports in communication, the bottom of the valve casing being open; an encircling flange around the opening; a disk valve resting on the flange; and a cover removably attached to the valve casing and inclosing the valve, the said valve casing lying entirely off to one side of the cap and off to one side of the heating chamber.

10. An apparatus of the class described, having a main receptacle; a centrally located heating chamber of cylindrical shape located below the receptacle, and being of a depth substantially as great as its diameter, said heating chamber terminating at substantially the level of the bottom of the receptacle; and a container for the substance from which the infusion is to be made, located adjacent to the upper part of the receptacle; in combination with a liquid percolating device, said device comprising a center tube; a cap connected to the tube adjacent to the lower end thereof, said cap extending down into the heating chamber, and also extending up into the receptacle, and entirely closing the top of the heating chamber; there being a port on one side of the cap, above the heating chamber; a valve casing having a port therein, said valve casing and cap being directly connected together, on one side of the cap, with the two ports in communication, the bottom of the valve casing being open; an encircling flange around the opening; a flat valve resting on the flange; and a cover removably attached to the valve casing and inclosing the valve, the said valve casing lying entirely off to one side of the cap and off to one side of the heating chamber.

11. An apparatus of the class described, having a main receptacle; a centrally located heating chamber of cylindrical shape located below the receptacle, and being of a depth substantially as great as its diameter, said heating chamber terminating at substantially the level of the bottom of the receptacle; and a container for the substance from which the infusion is to be made, located adjacent to the upper part of the receptacle; in combination with a liquid percolating device, said device comprising a center tube; a cap connected to the tube adjacent to the lower end thereof, said cap extending down into the heating chamber, and also extending up into the receptacle, and entirely closing the top of the heating chamber; there being a port on one side of the cap above the heating chamber; a valve casing of circular cross-section having a port therein, said valve casing and cap being directly connected together, on one side of the cap, with the two ports in communication, the bottom of the valve casing being open; an encircling flange around the opening; a disk valve resting on the flange; and a cover removably attached to the valve casing and inclosing the valve, the said valve casing lying entirely off to one side of the cap and off to one side of the heating chamber.

12. A coffee machine having a receptacle; a heating chamber of cylindrical shape having its longitudinal dimension greater than its cross-sectional dimension, and extending below the bottom of the receptacle and communicating with the interior thereof; a tube associated with the heating chamber and communicating with the interior thereof, said tube also extending up into the receptacle; a valve casing located above the heating chamber and within the receptacle, the interiors of the tube and valve casing communicating by means of a horizontal passage, said valve casing lying off to one side of the tube, and also off to one side of the heating chamber; and a vertically moving gravity valve within the valve casing.

13. A coffee machine having a receptacle; a heating chamber of cylindrical shape having its longitudinal dimension greater than its cross-sectional dimension, and extending below the center of the bottom of the receptacle and communicating with the interior thereof; a cap associated with the heating chamber and extending up into the receptacle, said cap closing the top of the heating chamber; a vertical tube passing through the top of the cap and extending down into the heating chamber; a valve casing, connected to the cap above the heating chamber and with the interiors of the cap and the valve casing communicating therewith by means of a horizontal passage, said valve casing lying off to one side of the cap, and a vertically moving gravity valve within said valve casing.

14. A coffee machine having a receptacle; a centrally located heating chamber extending below the bottom thereof, said heating chamber being of cylindrical shape, having its longitudinal dimension greater than its cross-sectional dimension; a centrally alined, vertical tube connecting with the heating chamber and extending up into the receptacle; a cylindrical cap, resting in the heating chamber and extending up into the receptacle and closing the top of the heating chamber; a valve casing, connected to the wall of the cylindrical cap to one side thereof, and above the heating chamber and off to one side thereof, and with the interiors of the cap and valve casing communicating by means of a horizontal passage, said casing having an inlet at the bottom, and a gravity valve in the valve casing.

15. In a coffee pot having a main receptacle, and a heating chamber at the base thereof, said heating chamber being of cylindrical shape, having its longitudinal dimension greater than its cross-sectional dimension, the combination with a percolator tube, and a cap, the said percolator tube extending into the main receptacle, and the said cap resting within the heating chamber and closing the top of the latter; a valve casing on one side of the cap, and above the heating chamber, and lying off to one side of said heating chamber and connected to the cap and communicating therewith by means of a horizontal passage, a valve within the casing, and a connection between the percolator tube and the cap, said connection consisting of screw threads on the percolator tube, engaging with screw threads in an opening in the upper end of the cap.

16. An apparatus of the class described, having a main receptacle; a centrally located heating chamber of cylindrical shape having its longitudinal dimension greater than its cross-sectional dimension, and located below the receptacle; and a container for the substance from which the infusion is to be made, located adjacent to the upper part of the receptacle; in combination with a liquid percolating device, said device comprising a center tube; a cap connected to the tube, adjacent to the lower end thereof, said cap extending down into the heating chamber, and also extending up into the receptacle, and entirely closing the top of the heating chamber; there being a port on one side of the cap above the heating chamber; a valve casing having a port therein, said valve casing and cap being connected together, on one side of the cap, with the two ports in communication, the bottom of the valve casing being open; an encircling flange around the opening; a flat valve resting on the flange; the said valve casing lying entirely off to one side of the cap and off to one side of the heating chamber.

17. A coffee pot having a receptacle, a heating chamber of relatively small size, depending from the bottom of the receptacle and communicating with the interior thereof, a cap covering the top of the heating chamber, a valve casing carried on one side of the cap above the heating chamber, the wall of said casing being connected to the wall of the cap, with the interior of the valve casing in communication with the interior of the cap above the heating chamber, said valve casing lying off to one side of the cap and also to one side of the heating chamber, and a vertically moving gravity valve within the casing.

18. A coffee pot having a receptacle, a heating chamber of relatively small size, depending from the bottom of the receptacle and communicating with the interior thereof, a cap covering the top of the heating chamber, a valve casing carried on one side of the cap above the heating chamber, the wall of said casing being connected to the wall of the cap, with the interior of the valve casing in communication with the interior of the cap above the heating chamber, said valve casing lying off to one side of the cap and also to one side of the heating chamber, and a vertically moving gravity valve within the casing; the connection between the valve casing and the cap being above the valve.

19. A coffee pot having a receptacle, a heating chamber, of relatively small size, depending from the bottom of the receptacle and communicating with the interior thereof, a cap covering the top of the heating chamber, a valve casing carried on one side of the cap above the heating chamber, the wall of said casing being connected to the cap, with their interiors in communication by means of a short horizontal passage above the heating chamber, said valve casing lying off to one side of the cap and also to one side of the heating chamber, and a vertically moving gravity valve within the casing.

20. A coffee pot having a receptacle, a heating chamber, of relatively small size, depending from the bottom of the receptacle and communicating with the interior thereof, a cap covering the top of the heating chamber, a valve casing carried on one side of the cap above the heating chamber, the wall of said casing being connected to the cap, with their interiors in communication by means of a short horizontal passage above the heating chamber, said valve casing lying off to one side of the cap and also to one side of the heating chamber, and a vertically moving gravity valve within the casing, the horizontal passage being located above the valve.

This specification signed and witnessed this 31st day of August, 1910.

CHARLES NELSON.
LEONARD H. DYER.

Witnesses:
  JOHN L. LOTSCH,
  GUSTAV SCHELLACK.

Copies of this patent may be obtained for five cents each, by addressing the "Commissioner of Patents, Washington, D. C."